(12) United States Patent
He et al.

(10) Patent No.: US 8,969,433 B2
(45) Date of Patent: Mar. 3, 2015

(54) THERMOPLASTIC COMPOSITIONS, METHOD OF MANUFACTURE, AND ARTICLES THEREFROM

(71) Applicant: SABIC Innovative Plastics IP B.V., Bergen Op Zoom (NL)

(72) Inventors: Yuanqing He, Newburgh, IN (US); Amit Kulkarni, Evansville, IN (US); Johannes Hubertus Lohmeijer, Hoogerheide (NL)

(73) Assignee: SABIC Global Technologies, B.V., Pittsfield, MA (US)

( * ) Notice: Subject to any disclaimer, the term of this patent is extended or adjusted under 35 U.S.C. 154(b) by 0 days.

(21) Appl. No.: 14/209,038

(22) Filed: Mar. 13, 2014

(65) Prior Publication Data

US 2014/0275372 A1 Sep. 18, 2014

Related U.S. Application Data

(60) Provisional application No. 61/779,460, filed on Mar. 13, 2013.

(51) Int. Cl.
| | |
|---|---|
| *C08K 9/06* | (2006.01) |
| *C08L 69/00* | (2006.01) |
| *C08K 3/34* | (2006.01) |
| *C09C 1/30* | (2006.01) |

(52) U.S. Cl.
CPC . *C08L 69/00* (2013.01); *C08K 9/06* (2013.01); *C08K 3/34* (2013.01); *C09C 1/3081* (2013.01); *C09C 1/309* (2013.01)
USPC ............................ 523/212; 524/451; 524/537

(58) Field of Classification Search
CPC ............ C08K 9/06; C08K 3/34; C08L 67/02; C08L 67/03; C08L 69/00; C09C 1/309; C09C 1/3081

USPC .................................. 523/212; 524/451, 537
See application file for complete search history.

(56) References Cited

U.S. PATENT DOCUMENTS

| | | | |
|---|---|---|---|
| 5,637,643 A | 6/1997 | Umeda et al. | |
| 6,025,421 A | 2/2000 | Atarashi et al. | |
| 7,744,993 B2 | 6/2010 | Wu et al. | |
| 7,858,700 B2 | 12/2010 | Bhat et al. | |
| 8,304,481 B2 * | 11/2012 | Nakamura et al. | ............ 524/451 |
| 2006/0287422 A1 | 12/2006 | Volkers et al. | |
| 2009/0215934 A1 | 8/2009 | Nakamura et al. | |
| 2009/0286023 A1 | 11/2009 | Dobreski et al. | |
| 2011/0182846 A1 | 7/2011 | Ikeda et al. | |

FOREIGN PATENT DOCUMENTS

| | | |
|---|---|---|
| EP | 1992663 | 11/2008 |
| JP | 2005048072 | 2/2005 |
| JP | 2006307033 | 11/2006 |
| JP | 03969006 | 8/2007 |
| JP | 2007238904 | 9/2007 |
| JP | 2007277382 | 10/2007 |
| JP | 2008024863 | 2/2008 |
| JP | 2008031224 | 2/2008 |
| JP | 04310205 | 8/2009 |
| JP | 2009191192 | 8/2009 |
| JP | 2010229305 | 10/2010 |

OTHER PUBLICATIONS

International Search Report of PCT/US2014/025780, mailed Jun. 20, 2014.

\* cited by examiner

*Primary Examiner* — Vickey Nerangis
(74) *Attorney, Agent, or Firm* — Honigman Miller Schwartz and Cohn LLP; Heidi M. Berven

(57) ABSTRACT

This disclosure relates to thermoplastic compositions, in particular polycarbonate thermoplastic compositions containing a surface-treated talc, methods for the manufacture of such compositions, and articles formed from the compositions.

15 Claims, No Drawings

THERMOPLASTIC COMPOSITIONS, METHOD OF MANUFACTURE, AND ARTICLES THEREFROM

CLAIM OF PRIORITY

This application claims priority to U.S. Provisional Application No. 61/779,460, filed Mar. 13, 2013. The entire contents of the aforementioned application is incorporated by reference herein.

FIELD OF THE INVENTION

This disclosure relates to thermoplastic compositions, in particular polycarbonate thermoplastic compositions containing a surface-treated talc, methods for the manufacture of such compositions, and articles formed from the compositions.

BACKGROUND

Polycarbonates are useful in the manufacture of articles and components for a wide range of applications, from automotive parts to electronic appliances. Because of their broad use, particularly in metal replacement applications, such as in automotive applications, there is a need for increased stiffness and reduced coefficient of thermal expansion of the materials, while at the same time maintaining their excellent ductility and flow properties.

One known method of increasing stiffness in polycarbonates is by the addition of inorganic particulate fillers such as clay, talc, and mica. However, the use of such fillers presents some drawbacks. Talc- and/or mica-filled polycarbonates and polycarbonate blends, can degrade upon processing. The degradation of polycarbonates and/or polycarbonate blends is known to the skilled practitioner and generally refers to a reduction in molecular weight and/or an adverse change in mechanical or physical properties. For example, the addition of these inorganic particulate fillers has been observed to affect the ductility and/or flow of polycarbonates and polycarbonate blends. Finally, the use of talc can give rise to poor stress transfer at the polymer-talc interface, leading to a reduction in tensile and flexural properties.

Various filler treatments intended to address the above drawbacks have been developed, including treatment with acid (see, e.g., US Publication No. 2006/0287422) and various substituted silanes (U.S. Pat. No. 5,637,643). However, neither the acid nor the silane treatments tested have been found to counter the adverse impact of talc on ductility or flow properties when added to polycarbonate blends, particularly with acrylonitrile-butadiene-styrene. Moreover, in some instances, the use of talcs treated with aminosilane coupling agents provides compositions with even less favorable properties, due to the degradation of the compositions mediated by the relative alkalinity of the amine moieties on the talc surface. In an alternative approach to improving the ductility of polymer-filler compositions, there are also reports of rubber particle encapsulation in the polymer matrix. However, doing so comes at the cost of reduced tensile and flexural properties.

Thus, there is a need for eliminating filler-induced polymer degradation in polycarbonate thermoplastic compositions, while at the same time improving the ductility and flow properties of these polycarbonate blends.

SUMMARY OF THE INVENTION

These and other needs are met by the present invention, which is directed to a polycarbonate-containing thermoplastic composition that contains surface-treated talc. The composition demonstrates improved impact and surface characteristics over polycarbonate-containing thermoplastic compositions that contain talc that is not surface treated.

In one aspect, the thermoplastic composition comprises, based on the total weight of the thermoplastic composition:
  (a) 30-60 percent of one or more polycarbonates;
  (b) 10-40 percent of one or more polyesters;
  (c) 0-30 percent of one or more impact modifiers; and
  (d) 5-35 percent of talc that is surface treated with a combination of 85 to 90 weight percent cetyl dimethicone and 10 to 15 percent 1-hexadecane, wherein the talc is characterized by:
    (i) a mean particle diameter if 1.8 µm;
    (ii) a Hegman fineness on grind value of 7;
    (iii) a surface area of 14 $m^2/g$; a specific gravity of 2.8;
    (iv) an average moisture of <0.5 weight percent; and
    (v) a bulk density of 40 $lbs/ft^3$.

Degradation of polycarbonates and/or polycarbonate blends is known to the skilled practitioner, and generally leads to a reduction in molecular weight and/or an adverse change in the mechanical or physical properties of the material. Thus it was surprising to find that the thermoplastic compositions of the present invention do not degrade (i.e., are more stable) and indeed, exhibit improved performance over known compositions containing talcs that are not surface treated.

In another aspect, the invention is directed to a process for making a thermoplastic composition comprising melt mixing the above-described components to form the thermoplastic composition.

In still another aspect, the invention provides an article comprising the above-described thermoplastic composition.

In another aspect, the invention provides a process for making an article comprising molding or extruding the above-described thermoplastic composition.

These and other features, aspects, and advantages of the present invention will become better understood with reference to the following description and appended claims.

DETAILED DESCRIPTION OF THE INVENTION

This written description uses examples to disclose the invention and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference. All ranges disclosed herein are inclusive of the endpoints, and the endpoints can be independently combined with each other. The use of the terms "a," "an," and "the" and similar referents in the context of describing the invention (especially in the context of claims) are to be construed to cover both their singular and plural meanings, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein, weight percents are based on a 100 weight percent composition.

The term "integer" means a whole number and includes zero. For example, the expression "n is an integer from 0 to 4" means n may be any whole number from 0 to 4, including 0 and 4.

Compounds are described using standard nomenclature. For example, any position not substituted by any indicated group is understood to have its valency filled by a bond as indicated or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen, or may be composed exclusively of carbon and hydrogen ("Alkyl"). Aliphatic groups may be substituted or unsubstituted. Exemplary aliphatic groups include, but are not limited to, methyl, ethyl, isopropyl, isobutyl, chloromethyl, hydroxymethyl (—$CH_2OH$), mercaptomethyl (—$CH_2SH$), methoxy, methoxycarbonyl ($CH_3OCO$—), nitromethyl (—$CH_2NO_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted or unsubstituted. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl.

The term "cycloaliphatic" refers to an array of atoms that is cyclic but is not aromatic. The cycloaliphatic group may include heteroatoms such as nitrogen, sulfur, selenium, silicon and oxygen, or may be composed exclusively of carbon and hydrogen. A cycloaliphatic group may comprise one or more noncyclic components. For example, a cyclohexylmethyl group ($C_6H_{11}CH_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "alkoxy" refers to an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl" refers to a hydrocarbon group of from 2 to 24 carbon atoms and structural formula containing at least one carbon-carbon double bond. Asymmetric structures such as (AB)C=C(EG) are intended to include both the cis and trans isomers. This can be presumed in structural formulae herein wherein an asymmetric alkene is present, or it can be explicitly indicated using standard notation.

The term "alkynyl" refers to a hydrocarbon group of 2 to 24 carbon atoms and a structural formula containing at least one carbon-carbon triple bond.

The term "aryl" refers to any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl" refers to a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" refers to an aryl group having an alkyl, alkynyl, or alkenyl group as defined above that is attached to the aromatic group. An example of an aralkyl group is a benzyl group.

The term "hydroxyalkyl" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" refers to an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" refers to a group represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate" as used herein refers to a group represented by the formula —OC(O)OR, where R can be hydrogen, alkyl, alkenyl, alkynyl, aryl, aralkyl, cycloalkyl, halogenated alkyl, or heterocycloalkyl group described above.

The term "carboxylic acid" refers to a group represented by the formula —C(O)OH.

The term "aldehyde" refers to a group represented by the formula —C(O)H.

The term "keto group" refers to a group represented by the formula —C(O)R, where R is an alkyl, alkenyl, alkynyl, aryl, aralkyl, cycloalkyl, halogenated alkyl, or heterocycloalkyl group described above.

The term "carbonyl group" refers to a group represented by the formula C=O.

The term "ether" refers to a group represented by the formula $AOA^1$, where A and $A^1$ can be the same or different as selected from the group consisting of an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" refers to a group represented by the formulas —S(O)$_2$R, —OS(O)$_2$R, or —OS(O)$_2$OR, where R can be hydrogen, alkyl, alkenyl, alkynyl, aryl, aralkyl, cycloalkyl, halogenated alkyl, or heterocycloalkyl group described above.

The phrase "surface treated" as in "surface treated talc" means that the talc or other filler has been treated with an organofunctional compound, such as an organofunctional silane. Such organofunctional silanes and their use in the surface treatment of talcs are known to the skilled artisan and are available from a number of suppliers including, for instance, Gelest and are listed at www.gelest.com/goods/pdf/couplingagents.pdf (last visited Mar. 12, 2014).

Each of the materials disclosed herein are either commercially available and/or the methods for the production thereof are known to those of skill in the art.

Components

As indicated, the invention disclosed herein is directed to a thermoplastic composition comprising a polycarbonate, a polyester, a talc such as Luzenac R7 talc, and an impact modifier.

Polycarbonate

As used herein, the terms "polycarbonate polymer" and "polycarbonate resin" mean compositions having repeating structural carbonate units of the Formula (1):

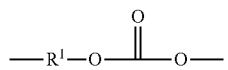

Formula 1 in which the R$^1$ groups are aromatic, aliphatic, or alicyclic organic radicals. In one embodiment, at least 60 percent of the total number of R$^1$ groups are aromatic organic radicals and the balance thereof are aliphatic, alicyclic, or aromatic radicals. In another embodiment, each R$^1$ is an aromatic organic radical, for example a radical of the Formula (2):

-A$^1$-Y$^1$-A$^2$   Formula 2 wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene. In one specific embodiment, the polycarbonate polymer is a linear homopolymer derived from bisphenol A, in which each of A$^1$ and A$^2$ is p-phenylene and Y$^1$ is isopropylidene.

Polycarbonate polymers may be produced by the reaction of dihydroxy compounds having the formula HO—R$^1$—OH, wherein R$^1$ is as defined above. Dihydroxy compounds suitable in an interfacial reaction include the dihydroxy compounds of formula (A) as well as dihydroxy compounds of formula (3)

HO-A$^1$-Y$^1$-A$^2$-OH   Formula 3 wherein Y$^1$, A$^1$ and A$^2$ are as described above. Also included are bisphenol compounds of general formula (4):

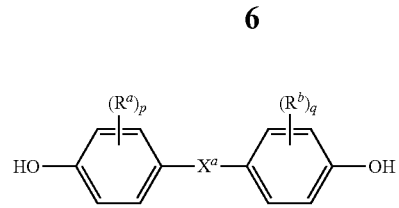

Formula 4 wherein R$^a$ and R$^b$ each represent a halogen atom or a monovalent hydrocarbon group and may be the same or different; p and q are each independently integers of 0 to 4; and X$^a$ represents one of the groups of formula (5):

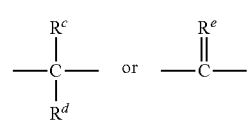

Formula 5 wherein R$^c$ and R$^d$ each independently represent a hydrogen atom or a monovalent linear or cyclic hydrocarbon group and R$^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4- hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used. The polycarbonate copolymers may be made by methods known in the art, such as by the method described in U.S. Application Publication 2003/0149223.

In some embodiments, blends of at least two different polycarbonate polymers are used. In some of these embodiments, blends of at least two polycarbonate polymers having different molecular weights are used. Branched polycarbonate polymers are also useful as well as blends of a linear polycarbonate polymer and a branched polycarbonate polymer. The branched polycarbonate polymers may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of 0.05 weight percent to 2.0 weight percent based on 100 parts by weight of the polycarbonate polymer. All types of polycarbonate polymer end groups are contemplated as being useful in the polycarbonate polymer composition, provided that such end groups do not significantly affect desired properties of the thermoplastic compositions.

"Polycarbonate polymers" and "polycarbonate resins" as used herein further include blends of polycarbonate polymers with other copolymers comprising carbonate chain units. A specific suitable copolymer is a "polyester carbonate", also known as a copolyester-polycarbonate. Such "polyester carbonate" copolymers further contain, in addition to recurring carbonate chain units of the formula (1), repeating units of formula (6)

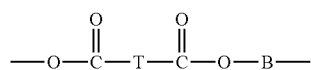

Formula 6 wherein B is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical. As used herein, polyester carbonate means compositions having at least 5 mole percent of carbonate linkages relative to the molar sum of the carbonate and ester linkages.

In one embodiment, B is a $C_{2-6}$ alkylene radical. In another embodiment, B is derived from an aromatic dihydroxy compound of formula (7):

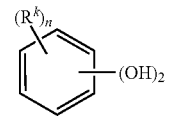

Formula 7 wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acid compounds that may be used to prepare the polyester carbonate include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 10:1 to 0.2:9.8. In another specific embodiment, B is a $C_{2-6}$ alkylene radical and T is p-phenylene, m-phenylene, naphthalene, a divalent cycloaliphatic radical, or a mixture thereof. This class of polyester carbonate includes the poly(alkylene terephthalates). Suitable aliphatic dicarboxylic acids include succinic acid, oxalic acid, malonic acid, glutaric acid, adipic acid, pimelic acid, suberic acid, azelaic acid, sebacic acid, undecanoic diacid, dodecanoic diacid, maleic acid and fumaric acid. Rather than utilizing the dicarboxylic acid per se, it is possible, and sometimes even preferred, to employ the reactive derivatives of the acid, such as the corresponding acid halides, in particular the acid dichlorides and the acid dibromides in the interfacial polymerization method or esters such as optionally substituted phenyl esters in the melt polymerization method. Thus, for example, instead of using isophthalic acid, terephthalic acid, or mixtures thereof, it is possible to employ isophthaloyl dichloride, terephthaloyl dichloride, and mixtures thereof.

Suitable polycarbonate polymers can be manufactured by processes such as interfacial polymerization or melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that can be used are catalysts of the formula $(R^3)_4Q^+X$, wherein each $R^3$ is independently the same or different and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4X$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 weight percent based on the weight of bisphenol in the phosgenation mixture. In another embodiment an effective amount of phase transfer catalyst can be 0.5 to 2 weight percent based on the weight of bisphenol in the phosgenation mixture. All types of polycarbonate end groups are contemplated as being useful in the thermoplastic composition, provided that such end groups do not significantly adversely affect desired properties of the compositions.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_{1-22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_{1-22}$ allyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonate polymers. Generally, in the melt polymerization process, polycarbonate polymers may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

Blends and/or mixtures of more than one polycarbonate polymer may also be used. For example, a high flow and a low flow polycarbonate polymer may be blended together. In one embodiment, a blend and/or mixture of linear polycarbonate polymers having a weight average molecular weight relative to polycarbonate polymer standards of less than 31,000 Daltons, specifically between 18,000 and 31,000 Daltons, is used.

In one embodiment, the polycarbonate is a 2,2-bis(4-hydroxyphenyl)propane (bisphenol-A) polycarbonate, commercially available under the trade designation LEXAN. More particularly, the polycarbonate is high flow High-flow (HF) Bisphenol A polycarbonate having a melt flow rate (MFR) of 23.5-28.5 grams/10 minutes measured at 300° C. and 1.2 kilograms load.

In one embodiment, the thermoplastic composition comprises about 30-60 percent of the polycarbonate. In another embodiment, the thermoplastic composition comprises about 35-55 percent of the polycarbonate. In another embodiment, the thermoplastic composition comprises about 40-50 percent of the polycarbonate. In another embodiment, the thermoplastic composition comprises about 42-48 percent of the polycarbonate.

Polyester

The composition comprises a polyester of Formula 8:

Formula 8
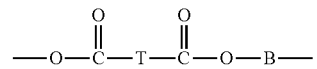

wherein:

B is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

Various polyesters can be used in this invention, but thermoplastic polyesters that are obtained by polymerizing dicarboxylic acids and dihydroxy compounds are particularly preferred.

Aromatic dicarboxylic acids, for example, terephthalic acid, isophthalic acid, naphthalene dicarboxylic acid and the like, can be used as these bifunctional carboxylic acids, and mixtures of these can be used as needed. Among these, terephthalic acid is particularly preferred. Also, to the extent that the effects of this invention are not lost, other bifunctional carboxylic acids such as aliphatic dicarboxylic acids can be used, such as oxalic acid, malonic acid, adipic acid, suberic acid, azelaic acid, sebacic acid, decane dicarboxylic acid, and cyclohexane dicarboxylic acid; and their ester-modified derivatives can also be used.

As dihydroxy compounds, straight chain aliphatic and cycloaliphatic diols having 2 to 15 carbon atoms can be used; for example, ethylene glycol, propylene glycol, 1,4-butanediol, trimethylene glycol, tetramethylene glycol, neopentyl glycol, diethylene glycol, cyclohexane dimethanol, heptane- 1,7-diol, octane-1,8-diol, neopentyl glycol, decane-1,10-diol, etc.; polyethylene glycol; bivalent phenols such as dihydroxydiarylalkanes such as 2,2-bis(4-hydroxylphenyl) propane that can be called bisphenol-A, bis(4-hydroxyphenyl) methane, bis(4-hydroxyphenyl) naphthylmethane, bis(4-hydroxyphenyl)phenylmethane, bis (4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl) ethane, 2-methyl-1,1-bis(4-hydroxyphenyl)propane, 2,2-bis (3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl) propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl) pentane, 4-methyl-2,2-bis(4-hydroxyphenyl)pentane, 2,2-bis (4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, and 2,2-bis(4-hydroxyphenyl)-1,1,1,3,3,3-hexafluoropropane; dihyroxydiarylcycloalkanes such as 1,1-bis(4-hydroxyphenyl)cyclohexane, 1,1-bis(3,5-dichloro-4-hydroxyphenyl)cyclohexane, and 1,1-bis(4-hydroxyphenyl)cyclodecane; dihydroxydiarylsulfones such as bis(4-hydroxyphenyl)sulfone, and bis(3,5-dimethyl-4-hydroxyphenyl)sulfone, bis(3-chloro-4-hydroxyphenyl)sulfone; dihydroxydiarylethers such as bis(4-hydroxyphenyl) ether, and bis(3-5-dimethyl-4-hydroxyphenyl)ether; dihydroxydiaryl ketones such as 4,4'-dihydroxybenzophenone, and 3,3',5,5'-tetramethyl-4,4-diydroxybenzophenone; dihydroxydiaryl sulfides such as bis(4-hydroxyphenyl)sulfide, bis(3-methyl-4-hydroxyphenyl)sulfide, and bis(3,5-dimethyl-4-hydroxyphenyl)sulfide; dihydroxydiaryl sulfoxides such as bis(4-hydroxyphenyl)sulfoxide; dihydroxydiphenyls such as 4,4'-dihydroxyphenyl; dihydroxyarylfluorenes such as 9,9-bis(4-hydroxyphenyl)fluorene; dihydroxybenzenes such as hydroxyquinone, resorcinol, and methylhydroxyquinone; and dihydroxynaphthalenes such as 1,5-dihydroxynaphthalene and 2,6-dihydroxynaphthalene. Also, two or more kinds of dihydroxy compounds can be combined as needed.

In a specific embodiment, the polyester is poly(ethylene terephthalate) (PET), poly(1,4-butylene terephthalate) (PBT), poly(ethylene naphthalate) (PEN), poly(butylene naphthalate) (PBN), and poly(1,3-propylene terephthalate) (PPT), and poly(cyclohexylenedimethylene terephthalate) (PCT), polytrimethylene terephthalate (PTT), poly (1,4-butylene succinate) (PBS), glycol modified polycyclohexylenedimethylene terephthalate (PCTG/PETG), poly(1,4-cyclohexylenedimethylene) 1,4-cyclohexanedicarboxylic acid (PCCD), or combinations thereof. In one embodiment, the polyester is PET or PBT.

In one embodiment, the polyester is poly(ethylene terephthalate). In another embodiment, the polyester is poly(1,4-butylene terephthalate). In another embodiment, the polyester is poly(trimethylene terephthalate), poly(ethylene naphthalate), poly(1,4-butylene naphthalate), poly(cyclohexanedimethanol terephthalate), poly(cyclohexanedimethanol-co-ethylene terephthalate), or poly(1,4-cyclohexanedimethyl-1,4-cyclohexanedicarboxylate), or mixtures thereof. More particularly, the polyester is poly(ethylene terephthalate). Desirably, the polyesters and blends of polyester and polycarbonate, discussed below, have a melt volume rate of about 5 to about 150 cc/10 min., specifically about 7 to about 125 cc/10 min, more specifically about 9 to about 110 cc/10 min, and still more specifically about 10 to about 100 cc/10 min., measured at 265° C. and a load of 5 kilograms according to ASTM D1238-04.

In another embodiment, the polyester is polyethylene terephthalate resin available as Laser+C(H) (C61A), from DAK Americas. In one embodiment, the thermoplastic composition comprises about 15-35 percent of the polyester. In another embodiment, the thermoplastic composition comprises about 20-30 percent of the polyester. In another embodiment, the thermoplastic composition comprises about 22-28 percent of the polyester.

Impact Modifier

In addition to the polycarbonate and polyester, the composition also comprises one or more impact modifiers. The impact modifier may include any of the known impact modifiers useful for polyesters, polycarbonates, block copolyestercarbonates or their blends. Useful impact modifiers may comprise an acrylic or methacrylic grafted polymer of a conjugated diene or an acrylate elastomer, alone or co-polymerized with a vinyl aromatic compound. These include ASA copolymers including acrylonitrile-styrene-butyl acrylate copolymers. Illustrative ASA copolymers typically contain about 35-55 percent acrylate, and preferably about 40-50 percent acrylate. Other grafted polymers are the core-shell polymers of the type available from Rohm & Haas, for example PARALOID™ EXL2691A, EXL2650A, PARALOID™ EXL3330, or PARALOID™ EXL3300. In general, these impact modifiers contain units derived from butadiene in combination with a vinyl aromatic compound, acrylate, or akylacrylate ester such as methacrylate. The aforementioned impact modifiers are disclosed in Fromuth, et al., U.S. Pat. No. 4,180,494; Owens, U.S. Pat. No. 3,808,180; Farnham, et al., U.S. Pat. No. 4,096,202; and Cohen, et al., U.S. Pat. No. 4,260,693.

The impact modifier may comprise a two stage polymer having either a butadiene or n-butyl acrylate based rubbery core and a second stage polymerized from methyl methacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate. Additional useful impact modifiers are of the type disclosed in U.S. Pat. No. 4,292,233. These impact modifiers comprise, generally, a relatively high content of a partially cross-linked butadiene polymer grafted base having grafted thereon acrylonitrile and styrene copolymers. Other useful impact modifiers are polyolefin copolymers with vinyl epoxide-derived units. Such epoxide functional copolymers may be prepared from an olefin, such as ethylene, and glycidyl acrylate or methacrylate. Other non-functionalized vinyl-containing monomers may also be incorporated such as alkyl acrylate or methacrylate, vinyl esters and vinyl ethers. Suitable epoxy-containing polyolefin copolymers and terpolymers are described in U.S. Pat. No. 5,907,026.

In one embodiment, the impact modifier is an acrylic grafted polymer of a conjugated diene, a methacrylic grafted polymer of a conjugated diene, or an acrylate elastomer. In another embodiment, the impact modifier is co-polymerized with a vinyl aromatic compound. In a further embodiment, the impact modifier is a core/shell copolymer. So-called core-shell polymers built up from a rubber-like core on which one or more shells have been grafted are preferably used. The core usually consists substantially of an acrylate rubber or a butadiene rubber. One or more shells have been grafted on the core. Usually these shells are built up for the greater part from a vinylaromatic compound and/or a vinylcyanide and/or an alkyl(meth)acrylate and/or (meth)acrylic acid. The core and/ or the shell(s) often comprise multi-functional compounds which may act as a cross-linking agent and/or as a grafting agent. These polymers are usually prepared in several stages. In one embodiment, the impact modifier is a core/shell copolymer of methyl methacrylate, butadiene and styrene (MBS) or a core/shell copolymer of acrylonitrile, butadiene and styrene (ABS).

In one embodiment, the thermoplastic composition comprises about 1-25 percent of the impact modifier. In another embodiment, the thermoplastic composition comprises about 5-15 percent of the impact modifier. In another embodiment, the thermoplastic composition comprises about 8-18 percent of the impact modifier.

Filler

In addition to the polycarbonate, polyester, and impact modifier, the thermoplastic composition also comprises talc. As provided herein "talc" means a mineral having the formula $H_2Mg_3(SiO_3)_4$ or $Mg_3Si_4O_{10}(OH)_2$ that is characterized as being greater than 97 percent talc by weight and less than 3 percent by weight of dolomite, magnasite and chlorite. As defined herein, "talc" has the following attributes:
 a mean particle diameter if 1.8 μm;
 a Hegman fineness on grind value of 7;
 a surface area of 14 m$^2$/g; a specific gravity of 2.8;
 an average moisture of <0.5 weight percent;
 a bulk density of 40 lbs/ft$^3$; and
 is surface treated with a combination of 85 to 90 weight percent cetyl dimethicone, CAS Reg. No. 191044-2 and 10 to 15 percent 1-hexadecane, CAS Reg. No. 629-73-2.

Surface treatments comprising cetyl dimethicone and 1-hexadecene are known in the art. For example, Phoenix Chemicals (Somerville, N.J.) commercially markets Pecosil® AS which is a liquid wax containing 85 to 90 percent cetyl dimethicone and 10 to 15 percent 1-hexadecene. The surface treatment has the following structure where R is $C_{16}$.

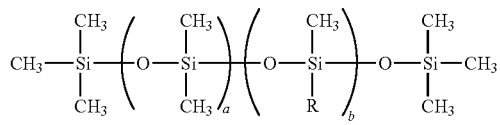

It is known that solids such as talc can be surface treated with waxes such as Pecosil® AS 16 by a variety of methods, for example, by providing a dispersion of the talc and surface treatment in a liquid such as water. The resulting dispersion is then warmed with mixing. The surface treated talc is then isolated by filtration, washed with water, and dried. The dried, surface treated talc can then be pulverized using a pulverizer.

The presence of the surface treatment on the talc can be confirmed by high temperature gas chromatography/mass spectrometry. In a typical method, 2 grams of surface treated talc is extracted with 8 mL chloroform for 4 hours. The extract is filtered using a green-band filter (0.45 μm) and then analyzed by GC-MS using a GC 7890A series gas chromatograph (Agilent Technologies) equipped with a quadrupole mass spectrometer (5975C inert, Agilent technologies) and an Agilent VF5ht UltiMetal column (15 m×0.250 mm×0.1 μm+2 m RG) for a sample injection volume of 1 microliter.

In a particular embodiment, the talc is Luzenac R7 from Imerys. Luzenac R7 is a very platy, ultrafine, talc that is surface treated with a surface treatment such as comprising 85-90 percent cetyl dimethicone and 10 to 15 1-hexadecene. Such a surface treatment is Pecosil® AS 16. Luzenac R7 is further characterized by a mean particle diameter if 1.8 μm; a Hegman fineness on grind value of 7; a surface area of 14 m$^2$/g; a specific gravity of 2.8; an average moisture of less than 0.5 weight percent; and a bulk density of 40 lbs/ft$^3$. Mineral analysis of Luzenac R7 shows that it comprises greater than 97 percent talc by weight and less than 3 percent by weight of dolomite, magnasite and chlorite.

In addition to talc, the composition can comprise one or more additional fillers which includes minerals such as talc that is not surface treated, clay, mica, barite, wollastonite and supplemental reinforcing such as flaked or milled glass, and the like.

In one embodiment, the thermoplastic composition comprises about 10-30 percent of a surface-treated talc. In another embodiment, the thermoplastic composition comprises about 15-25 percent of the surface-treated talc. In another embodiment, the thermoplastic composition comprises about 18-22 percent of the surface-treated talc.

Other Components

In addition to the above components, the thermoplastic composition may include various additives ordinarily incorporated in resin compositions of this type, with the proviso that the additives are selected so as to not significantly adversely affect the desired properties of the thermoplastic composition, for example, impact strength. Combinations of additives can be used. Such additives can be mixed at a suitable time during the mixing of the components for forming the composition. Other components may be selected from the group consisting of flame retardants, antidrip agents, antioxidants, heat stabilizers, quenchers, neutralizers, light stabilizers, antistatic agents, and radiation stabilizers, which are briefly described in the following paragraphs.

Flame retardants include organic compounds that include phosphorus, bromine, and/or chlorine. Non-brominates and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl) p-tolyl phosphate, tritolyl phosphate, bis(2-ethylhexyl)phenyl phosphate, tri(nonylphenyl)phosphate, bis(dodecyl) p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds as shown below:

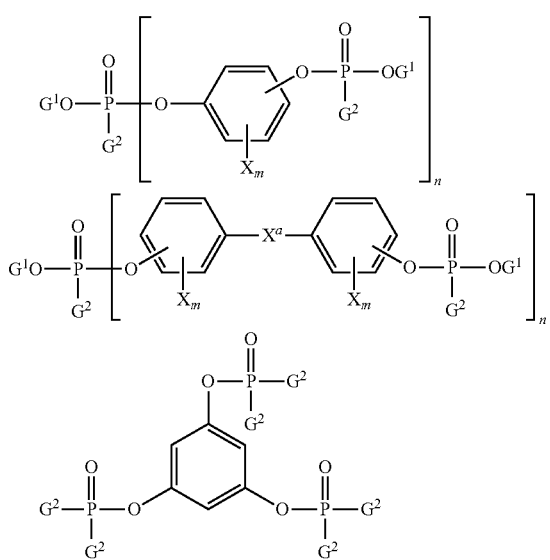

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphate oxide. When present, phosphorus-containing flame retardants are generally present in amounts of 1 to 10 parts by weight, based on 100 parts by weight of the total composition.

Halogenated materials can also be used as flame retardants, for example halogenated compounds and resins as shown below:

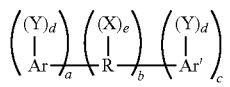

wherein R is an alkylene, alkylidene or cycloaliphatic linkage, for example, methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, for example, sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in the above formula are each independently mono- or polycarbocyclic aromatic groups such as phenylene, biphenylene, terphenylene, naphthylene, or the like.

Y is an organic, inorganic, or organometallic group, for example (1) halogen, for example, chlorine, bromine, iodine, fluorine or (2) ether groups of the general formula OB, wherein B is a monovalent hydrocarbon group similar to X or (3) monovalent hydrocarbon groups of the type represented by R or (4) other substituents, for example, nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of 0.1 to 20 parts by weight, more specifically 1 to 15 parts by weight, based on 100 parts by weight of the total composition.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, KAlF$_4$, K$_2$SiF$_6$, and/or Na$_3$AlF$_6$ or the like. When present, inorganic flame retardant salts are generally present in amounts of 1 to 10 parts by weight, more specifically 0.05 to 5 parts by weight, based on 100 parts by weight of the total composition.

Anti-drip agents include fibril forming or non-fibril forming fluoropolymer such as polytetrafluoroethylene (PTFE) can be used. The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 weight percent PTFE and 50 weight percent SAN, based on the total weight of the encapsulated fluoropolymer. The SAN can comprise, for example, 75 weight percent styrene and 25 weight percent acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 1.4 percent by weight, based on the weight of the total composition.

Antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid, stearyl-3-(3'5'-di-t-butyl-4-hydroxyphenyl)propionate or the like, or combinations comprising at least one of the foregoing antioxidants. Antioxidants are generally used in amounts of 0.1 to 1 parts by weight, based on 100 parts by weight of the total composition.

Heat stabilizer additives can also be used in the thermoplastic compositions. Heat stabilizers include, for example, organophosphites such as triphenyl phosphite, tris-(2,6-dimethylphenyl)phosphite, tris-(mixed mono- and di-nonylphenyl)phosphite, phosphorous acid or the like; phosphonates such as dimethylbenzene phosphonate or the like, phosphates such as monozinc phosphate, phosphoric acid or trimethyl phosphate, or the like, or combinations comprising at least one of the foregoing heat stabilizers. Heat stabilizers are generally used in amounts of 0.01 to 5 parts by weight, based on 100 parts by weight of the total composition.

Quenchers (also known as catalyst inactivators, transesterification stabilizers, processing stabilizers) include zinc phosphate, mono zinc phosphate, phosphorous acid or phosphoric acid (diluted in water), sodium acid pyrophosphate and other phosphorous based compounds. Quenchers are not restricted to just phosphorus-based compounds, they can also include silicon-based compounds (such as tetrapropyl orthosilicate or tetrakis-(2-methoxyethoxy)silane). Sometimes they could also include compounds such as sodium lauryl sulphate, boric acid, citric acid, oxalic acid, and cyclic iminoether containing compounds. Quenchers can be used in an amount that is at least 0.0001 based on the total weight of the polyester-polycarbonate polymer, the poly(C$_4$-alkylene terephthalate)ester, and the polyester. In one suitable embodiment, the amount of the Quenchers can range from 0.0001 to 0.2 percent by weight, based on the total weight of the polyester-polycarbonate polymer, the poly(C$_4$-allylene terephthalate)ester, and the polyester.

Neutralizing additives include, for example, melamine, polyvinylpyrrolidone, dicyandiamide, triallyl cyanurate, urea derivatives, hydrazine derivatives, amines, polyamides, and polyurethanes; alkali metal salts and alkaline earth metal salts of higher fatty acids, such as for example, calcium stearate, calcium stearoyl lactate, calcium lactate, zinc stearate, magnesium stearate, sodium ricinoleate, and potassium palmitate; antimony pyrocatecholate, zinc pyrocatecholate, and hydrotalcites and synthetic hydrotalcites. Hydroxy carbonates, magnesium zinc hydroxycarbonates, magnesium aluminum hydroxycarbonates, and aluminum zinc hydroxycarbonates; as well as metal oxides, such as zinc oxide, magnesium oxide and calcium oxide; peroxide scavengers, such as, e.g., (C$_{10}$-C$_{20}$) alkyl esters of beta-thiodipropionic acid, such as for example the lauryl, stearyl, myristyl or tridecyl esters; mercapto benzimidazole or the zinc salt of 2-mercaptobenzimidazole, zinc-dibutyldithiocarbamate, dioctadecyldisulfide, and pentaerythritol tetrakis(β-dodecylmercapto)propionate may also be used. When present, the neutralizers may be used in amounts of about 5 to about 50 parts by weight, more specifically about 10 to about 40 parts by weight, based on 100 parts by weight of the polymer portion of the composition.

Light stabilizers and/or ultraviolet light (UV) absorbing additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.1 to 5 parts by weight, based on 100 parts by weight of the total composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenyl-acryloyl)oxy]methyl]propane (UVINUL® 3030); 2,2'-(1,4-phenylene)bis (4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 1 to 10 parts by weight, based on 100 parts by weight of the total composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that can be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of 0.1 to 3 parts by weight, based on 100 parts by weight of the total composition.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.1 to 5 parts by weight, based on 100 parts by weight of the total composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3''',5'''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the total composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-C(R^4)_2OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl alcohol. 2-Methyl-2,4-pentanediol, polyethylene glycol, and polypropylene glycol are often used for gamma-radiation stabilization. Gamma-radiation stabilizing compounds can be used in amounts of 0.001 to 1 parts by weight based on 100 parts by weight of the total composition.

Plasticizers, lubricants, and/or mold release agents can also be used in the thermoplastic compositions. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis (diphenyl)phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.1 to 10 parts by weight, based on 100 parts by weight of the total composition.

Compositions

In one aspect, the thermoplastic composition comprises, based on the total weight of the thermoplastic composition:
(a) 30-60 percent of one or more polycarbonates;
(b) 10-40 percent of one or more polyesters;
(c) 0-30 percent of one or more impact modifiers; and
(d) 5-35 percent of talc that is surface treated with a combination of 85 to 90 weight percent cetyl dimethicone and 10 to 15 percent 1-hexadecane, wherein the talc is characterized by:
  (i) a mean particle diameter if 1.8 μm;
  (ii) a Hegman fineness on grind value of 7;
  (iii) a surface area of 14 m$^2$/g; a specific gravity of 2.8;
  (iv) an average moisture of <0.5 weight percent; and
  (v) a bulk density of 40 lbs/ft$^3$.

In one embodiment of this aspect, the thermoplastic composition comprises, based on the total weight of the thermoplastic composition:
(a) 35-55 percent of a polycarbonate;
(b) 15-35 percent of a polyester;
(c) 2-20 percent of an impact modifier; and
(d) 10 to 30 percent of talc that is surface treated with a combination of 85 to 90 weight percent cetyl dimethicone and 10 to 15 percent 1-hexadecane, wherein the talc is characterized by:
  (i) a mean particle diameter if 1.8 μm;
  (ii) a Hegman fineness on grind value of 7;
  (iii) a surface area of 14 m$^2$/g; a specific gravity of 2.8;
  (iv) an average moisture of <0.5 weight percent; and
  (v) a bulk density of 40 lbs/ft$^3$.

In another embodiment of this aspect, the thermoplastic composition comprises, based on the total weight of the thermoplastic composition:
(a) 40-50 percent of a polycarbonate;
(b) 20-30 percent of a polyester;
(c) 5-15 percent of an impact modifier; and
(d) 15-25 percent of talc that is surface treated with a combination of 85 to 90 weight percent cetyl dimethicone and 10 to 15 percent 1-hexadecane, wherein the talc is characterized by:
  (i) a mean particle diameter if 1.8 μm;
  (ii) a Hegman fineness on grind value of 7;
  (iii) a surface area of 14 m$^2$/g; a specific gravity of 2.8;
  (iv) an average moisture of <0.5 weight percent; and
  (v) a bulk density of 40 lbs/ft$^3$.

In another embodiment, the thermoplastic composition comprises, based on the total weight of the thermoplastic composition:
(a) 42-48 percent of a polycarbonate;
(b) 22-28 percent of a polyester;
(c) 8-13 percent of an impact modifier; and
(d) 18-24 percent of talc that is surface treated with a combination of 85 to 90 weight percent cetyl dimethicone and 10 to 15 percent 1-hexadecane, wherein the talc is characterized by:
  (i) a mean particle diameter if 1.8 μm;
  (ii) a Hegman fineness on grind value of 7;
  (iii) a surface area of 14 m$^2$/g; a specific gravity of 2.8;
  (iv) an average moisture of <0.5 weight percent; and
  (v) a bulk density of 40 lbs/ft$^3$.

In another embodiment, the thermoplastic composition comprises, based on the total weight of the thermoplastic composition:
(a) 40-50 percent of a polycarbonate;
(b) 20-30 percent of poly(ethylene terephthalate);
(c) 5-15 percent of methyl methacrylate butadiene shell copolymer; and
(d) 15-25 percent of talc that is surface treated with a combination of 85 to 90 weight percent cetyl dimethicone and 10 to 15 percent 1-hexadecane, wherein the talc is characterized by:
  (i) a mean particle diameter if 1.8 μm;
  (ii) a Hegman fineness on grind value of 7;
  (iii) a surface area of 14 m$^2$/g; a specific gravity of 2.8;
  (iv) an average moisture of <0.5 weight percent; and
  (v) a bulk density of 40 lbs/ft$^3$.

In another embodiment, the weight ratio of polycarbonate to polyester is about 1:1 to 2:1. In another embodiment, the ratio is about 1.5:1. In another embodiment, the ratio is about 2:1.

In these and other embodiments, the thermoplastic composition comprises 0-1 percent of a lubricant based on the total weight of the thermoplastic composition. In one embodiment, the lubricant is pentaerythritol tetrastearate.

In these and other embodiments, the thermoplastic composition comprises 0-1 percent of an antioxidant based on the total weight of the thermoplastic composition. In one embodiment, the antioxidant is stearyl-3-(3'5'-di-t-butyl-4-hydroxyphenyl)propionate.

In these and other embodiments, the thermoplastic composition further comprises 0-1 percent of a heat stabilizer based on the total weight of the thermoplastic composition. In one embodiment, the heat stabilizer is monozinc phosphate.

In these and other embodiments the thermoplastic composition further comprises 0-1 percent of a colorant based on the total weight of the thermoplastic composition. In one embodiment, the colorant is carbon black.

In another embodiment, the thermoplastic composition comprises:
(a) 42-48 percent of a polycarbonate;
(b) 22-28 percent of a polyester;
(c) 8-13 percent of an impact modifier; and
(d) 18-24 percent of talc that is surface treated with a combination of 85 to 90 weight percent cetyl dimethicone and 10 to 15 percent 1-hexadecane, wherein the talc is characterized by:
  (i) a mean particle diameter if 1.8 μm;
  (ii) a Hegman fineness on grind value of 7;
  (iii) a surface area of 14 m$^2$/g; a specific gravity of 2.8;
  (iv) an average moisture of <0.5 weight percent; and
  (v) a bulk density of 40 lbs/ft$^3$.

In another embodiment, the thermoplastic composition further comprises:
(e) 0-1 percent of an antioxidant.

In another embodiment, the thermoplastic composition further comprises:
(e) 0-1 percent of an antioxidant; and
(f) 0-1 percent of a heat stabilizer.

In another embodiment, the thermoplastic composition comprises:

(e) 0-1 percent of an antioxidant;
(f) 0-1 percent of a heat stabilizer; and
(g) 0-1 percent of a colorant.

In another embodiment, the invention provides a thermoplastic composition as described in any of the previous paragraphs wherein the polycarbonate retains at least 80 to 98 percent, specifically at least 85 to 98 percent, more specifically at least 90 to 98 percent of its initial weight average molecular weight after processing, i.e., after compounding.

In another embodiment, the invention provides a thermoplastic composition as described in any of the previous paragraphs characterized by substantially no reduction in the molecular weight of the polycarbonate component of the thermoplastic composition upon compounding. "Substantially no reduction in the molecular weight" means that there is 15 percent or less change in the molecular weight of the compounded polycarbonate as compared to molecular weight of the compounded polycarbonate in a composition containing un-treated talc. More preferably, there is a 10 percent or less change in the molecular weight of the compounded polycarbonate as compared to molecular weight of the compounded polycarbonate in a composition containing un-treated talc. More preferably, there is a 5 percent or less change in the molecular weight of the compounded polycarbonate as compared to molecular weight of the compounded polycarbonate in a composition containing un-treated talc. More preferably, there is a 3 percent or less change in the molecular weight of the compounded polycarbonate as compared to molecular weight of the compounded polycarbonate in a composition containing un-treated talc.

In addition, the thermoplastic compositions are also characterized by a substantial increase in the molecular weight of the polyester component of the thermoplastic composition upon compounding. A "substantial increase in the molecular weight" means that there is 5 percent or more change in the molecular weight of the compounded polyester as compared to the molecular weight of the compounded polyester in a composition containing un-treated talc. More preferably, there is an 8 percent or more change in the molecular weight of the compounded polyester as compared to the molecular weight of the compounded polyester in a composition containing un-treated talc. More preferably, there is a 10 percent or more change in the molecular weight of the compounded polyester as compared to the molecular weight of the compounded polyester in a composition containing un-treated talc.

In another embodiment, the invention provides a thermoplastic composition as described in any of the previous paragraphs characterized by improved mechanical or physical properties. In particular, the thermoplastic compositions described in any of the previous paragraphs are characterized by a substantial increase in melt viscosity (MV) as measured according to ISO11443. "Substantial increase in melt viscosity" means the melt viscosities of the thermoplastic compositions of the present invention are 5 percent or greater than the melt viscosity of a thermoplastic composition containing talc that is not surface treated. More preferably, the melt viscosity of the thermoplastic compositions of the present invention are 7 percent or greater than the melt viscosity of a thermoplastic composition containing talc that is not surface treated. More preferably, the melt viscosity of the thermoplastic compositions of the present invention are 10 percent or greater than the melt viscosity of a thermoplastic composition containing talc that is not surface treated In another embodiment, the thermoplastic compositions described in any of the previous paragraphs are characterized by a substantial decrease in melt-volume flow rate (MVR) as measured according to ISO1133. "Substantial decrease in melt-volume flow rate means the melt-volume flow rates of the thermoplastic compositions of the present invention are 5 percent or more than the melt-volume flow rates of a thermoplastic composition containing talc that is not surface treated. More preferably, the melt-volume flow rate means the melt-volume flow rates of the thermoplastic compositions of the present invention are 10 percent or more than the melt-volume flow rates of a thermoplastic composition containing talc that is not surface treated. More preferably, the melt-volume flow rate means the melt-volume flow rates of the thermoplastic compositions of the present invention are 15 percent or more than the melt-volume flow rates of a thermoplastic composition containing talc that is not surface treated. More preferably, the melt-volume flow rate means the melt-volume flow rates of the thermoplastic compositions of the present invention are 20 percent or more than the melt-volume flow rates of a thermoplastic composition containing talc that is not surface treated.

In another embodiment, the invention provides a thermoplastic composition comprising, based on the total weight of the thermoplastic composition:

(a) 30-60 percent of one or more polycarbonates;
(b) 10-40 percent of one or more polyesters;
(c) 1-30 percent of one or more impact modifiers; and
(d) 18-24 percent of talc that is surface treated with a combination of 85 to 90 weight percent cetyl dimethicone and 10 to 15 percent 1-hexadecane, wherein the talc is characterized by:
 (i) a mean particle diameter if 1.8 μm;
 (ii) a Hegman fineness on grind value of 7;
 (iii) a surface area of 14 $m^2$/g; a specific gravity of 2.8;
 (iv) an average moisture of <0.5 weight percent; and
 (v) a bulk density of 40 lbs/$ft^3$ wherein:

there is a 10 percent or less change in the molecular weight of the compounded polycarbonate as compared to molecular weight of the compounded polycarbonate in a composition containing talc that is not surface treated;

the melt viscosity (MV) is 7 percent greater than the melt viscosity of a thermoplastic composition containing talc that is not surface treated;

the melt-volume flow rate (MVR) as measured according to ISO1133 is 10 percent greater than the melt-volume flow rates of a thermoplastic composition containing talc that is not surface treated.

In another embodiment, the thermoplastic compositions described in any of the previous paragraphs are characterized by improved surface quality of the thermoplastic composition under high shear. A center gated disk device was used to achieve high shear rates. The thermoplastic compositions described in any of the previous paragraphs were checked for dispersion and surface aesthetics. Significant spay was observed in compositions containing talc that is not surface treated, whereas compositions containing treated talc exhibited no splay.

Process of Making

To prepare the thermoplastic compositions of the present invention, the components may be mixed by any known method. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device. preferably via multiple feeding systems. In the melt mixing step, the ingredients are typically melt kneaded in a single screw or twin screw extruder, a Banbury mixer, a two roll mill, or similar device. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Article

The thermoplastic composition of the present invention may be shaped into a final article by various techniques known in the art such as injection molding, extrusion, gas assist blow molding, or vacuum forming. Specific exemplary articles include, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the thermoplastic compositions can be used for such applications as automotive parts, including panel and trim, spoilers, luggage doors, body panels, as well as walls and structural parts in recreation vehicles. The compositions are particularly useful for load-bearing components, particularly load-hearing automotive components.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

The examples employed the materials listed in Table 1. All weight percents employed in the examples are based on the weight percent of the entire composition except where stated otherwise.

TABLE 1

Chemicals Used.

| Component | Trade name and Supplier |
|---|---|
| Polycarbonate (PC) | ML5221:/PC175: High-flow Bisphenol A polycarbonate having a melt flow rate (MFR) of 23.5-28.5 grams/10 minutes measured at 300° C. and 1.2 kilograms load from SABIC |
| Polyester (PET) | Polyethylene terephthalate resin having an intrinsic viscosity of 0.83 +/− 0.02 dL/g available as Laser + C(H) (C61A) from DAK Americas. |
| Impact Modifier (IM) | Stabilized methyl methacrylate butadiene styrene core-shell copolymer comprising 70-74 weight percent Butadiene with a bulk density 0.35-0.49 g/cc commercially available from Dow as Paraloid EXL-2691A |
| Talc 1 | Cimpact 710 Talc commercially available from Imerys with a 1.8 μm mean diameter |
| Talc 2 (Surface-treated Talc) | The surface-treated talc is commercially available from Imerys as Luzenac R7 |
| Lubricant | Pentaerythritol tetrastearate, CAS Reg. No. 115-83-3 commercially available from Faci as PETS G |

TABLE 1-continued

Chemicals Used.

| Component | Trade name and Supplier |
|---|---|
| Antioxidant (AO) | Stearyl-3-(3'5'-di-t-butyl-4-hydroxyphenyl)propionate, CAS Reg. No. 2082-79-3, commercially available under the tradename Irganox 1076 from BASF. |
| Heat Stabilizer | Monozinc phosphate CAS Reg. No. 13598-37-3 commercially available from Budenheim USA, Inc. as Z21-82 |
| Colorant | Carbon black having an iodine absorption of 231 grams per kilogram determined according to ASTM D1510-02a commercially available from Cabot as Monarch 800. |

The ISO tests used to characterize the prepared compositions are summarized in Table 2.

TABLE 2

ISO Tests.

| Test | Description |
|---|---|
| Multi-axial Impact (MAI) | ISO 6603-2: 2000. Multi-axial impact (MAI) performance data are measured according to ISO 6603-2: 2000 at −30, −20, −10, 0, and 23° C. |
| Izod Impact Strength (NII) | ISO 180. NII is used to measure the impact resistance of plastic materials. Izod Impact was determined using a 3.2 mm thick, molded Izod notched impact (INI) bar. It was determined per ISO 180/1A. Results are reported in kJ/m². |
| Melt Viscosity (MV) | ISO11443. Melt Viscosity (MV) is measured at 270° C. according to ISO11443. Results are reported in Pa S. |
| Melt-Volume Flow Rate (MVR) | ISO 1133. Melt Volume Rate (MVR) was determined at 265° C. using a 5-kilogram weight, over 10 minutes, in accordance with ISO 1133. |
| Tensile | ISO527. |
| Heat Distortion Temperature | ISO 75. HDT was measured at 1.8 MPa on 6.4 mm thick bars. |
| Vicat Softening Temperature | ISO 306. Vicat Softening temperature was measured according to ISO 306 at 120' C./hr and 50N load. |
| Coefficient of Thermal Expansion | SABIC Method. Coefficient of Thermal Expansion by TMA: Both with-flow and cross-flow on a single part. Results are reported in um/(° C.-m), measured in temperature range from −40° C. to 40° C. |

In addition to the tests described in Table 2, polymer molecular weights were also determined. Polymer molecular weight can be used as an indicator of stability. Polymer molecular weight is measured by gel permeation chromatography (GPC) in hexafluoroisopropanol/methylene chloride solvent using polystyrene calibration standards. Changes in weight average molecular weight are typically used. This provides a means of measuring changes in chain length of a polymeric material, which can be used to determine the extent of degradation of the thermoplastic as a result of processing. Degraded materials would generally show reduced molecular weight, and could exhibit reduced physical properties. Typically, molecular weights are determined before and after processing, and the molecular weight retention is the molecular weight after processing as a percentage of the molecular weight before processing.

The thermoplastic compositions described in the following examples were prepared from the components described in Table 1. In each of the examples, samples were prepared by melt extrusion on a Werner & Pfleiderer™ 40 mm twin screw extruder at a nominal melt temperature of about 260° C., about 18 inch vacuum and about 500 RPM The extrudate was pelletized and dried at about 120° C. for about 4 hours. To make test specimens, the dried pellets were injection molded on an 120-Tome injection molding machine at a nominal melt temperature of 270° C., with the melt temperature approximately 5 to 10° C. higher.

Table 3 summarizes the composition that was tested. As Table 3 indicates, a PC/PET blend was prepared using the surface-treated talc, Luzenac R7.

TABLE 3

| Component | Weight Percent |
| --- | --- |
| Polycarbonate | 44.85 |
| Polyester | 25 |
| Impact Modifier (IM) | 10 |
| Talc | 19 |
| Lubricant | 0.3 |
| Antoxidant | 0.2 |
| Monozinc Phosphate | 0.15 |
| Carbon Black | 0.5 |
| | 100.0 |

Table 4 summarizes the results. In the table, "E" designates an example in accordance with the invention, and "C" designates the comparative example. The Comparitor C-1 employed talc that was not surface treated. The talc had a mean particle diameter of 1.8 μm and top size 12.5 μm (7 Hegman) and is available from Imerys as Cimpact 710.

TABLE 4

| | | | Talc type | |
| --- | --- | --- | --- | --- |
| | | | Talc 1 | Talc 2 |
| Test Code | Test Description | Unit | C-1 | E1 |
| PC Mw | PC Mw vs. C-1 | % | 100 | 99 |
| PET Mw | PET Mw vs. C-1 | % | 100 | 111 |
| Melt viscosity, ISO11443 | 270° C., 645 s$^{-1}$ | Pa-S | 264 | 295 |
| | 270° C.,, 1500 s$^{-1}$ | Pa-S | 197 | 209 |
| | 270° C.,, 5000 s$^{-1}$ | Pa-S | 104 | 112 |
| Melt-volume flow rate, ISO1133 | 265° C./5 kg/300 s dwell | cm$^3$/10 min | 28 | 20 |
| Izod impact notched, ISO180 | Ductility, 23° C.,/5.5 J | % | 0 | 0 |
| | Impact, 23° C.,/5.5 J | kJ/m$^2$ | 6 | 6 |
| Izod impact unnotched, ISO180 | Ductility, −30° C.,/5.5 J | % | 0 | 0 |
| | Impact, −30° C.,/5.5 J | kJ/m$^2$ | 67 | 74 |
| Multi-axial Impact, ISO6603 | Puncture Energy, 23° C., 4.5 m/s | % | 0 | 20 |
| | Ductility, 23° C., 4.5 m/s | J | 43 | 60 |
| Tensile, ISO527 | Ten Modulus, 5 mm/min, 23° C. | Mpa | 3737 | 3810 |
| | Ten Elongation at break, 5 mm/min, 23° C. | Mpa | 43 | 41 |
| Heat deflection temperature, ISO75 | 0.45 MPa | ° C. | 128 | 129 |
| Vicat temperature, ISO306 | B/50 | ° C. | 135 | 135 |
| Coefficient of Thermal Expansion (CLTE) | flow | um/(m-° C.) | 52 | 50 |
| | Xflow | um/(m-° C.) | 111 | 105 |

PC and PET molecular weights (MW) were examined. There was not a significant reduction in the molecular weight of the polycarbonate in E-1 as compared to C-1 after processing, indicating the PC degradation was minimal when Luzenac R-7 was used. However, it is noteworthy that the molecular weight of the PET component increased greater than 10 percent in E-1 as compared to C-1. As a result, the melt viscosity of E-1 increased compared to C-1, and the MVR decreased. Tensile modulus, HDT, Vicat softening temperature and CLTE were also tested for E-1 and found to be comparable C-1.

The surface quality of molded parts under high shear prepared from E-1 was examined and compared to C-1. A center gated disk tool was used to achieve high shear rates, and samples were checked for dispersion/surface aesthetic improvements. A disk was molded with 4" diameter and 3.2 mm in thickness through a center gated injection. Typically, splay is found around the injection gate. Both standard and abusive molding conditions were employed to mold the disks. There was significant splay in C-1 sample, whereas E-1 was characterized by no splay.

The foregoing invention has been described in some detail by way of illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A thermoplastic composition comprising, based on the total weight of the thermoplastic composition:
   (a) 30-60 percent of one or more polycarbonates;
   (b) 10-40 percent of one or more polyesters;
   (c) 0-30 percent of one or more impact modifiers;
   (d) 5-35 percent of talc that is surface treated with a combination of 85 to 90 weight percent cetyl dimethicone and 10 to 15 percent 1-hexadecane, wherein the talc is characterized by:
      (i) a mean particle diameter of 1.8 μm;
      (ii) a Hegman fineness on grind value of 7;
      (iii) a surface area of 14 m$^2$/g; and a specific gravity of 2.8;
      (iv) an average moisture of <0.5 weight percent; and
      (v) a bulk density of 40 lbs/ft$^3$.

2. The thermoplastic composition of claim 1, where in the weight percent ratio of polycarbonate to polyester is 1:1 to 4:1.

3. The thermoplastic composition of claim 1, comprising based on the total weight of the thermoplastic composition:
   (a) 35-55 percent of a polycarbonate;
   (b) 15-35 percent of a polyester;
   (c) 2-20 percent of an impact modifier; and
   (d) 10-30 percent of talc that is surface treated with a combination of 85 to 90 weight percent cetyl dimethicone and 10 to 15 percent 1-hexadecane, wherein the talc is characterized by:
      (i) a mean particle diameter of 1.8 μm;
      (ii) a Hegman fineness on grind value of 7;
      (iii) a surface area of 14 m$^2$/g; and a specific gravity of 2.8;
      (iv) an average moisture of <0.5 weight percent; and
      (v) a bulk density of 40 lbs/ft$^3$.

4. The thermoplastic composition of claim 1, comprising based on the total weight of the thermoplastic composition:
   (a) 42-48 percent of a polycarbonate;
   (b) 22-28 percent of a polyester;
   (c) 8-13 percent of an impact modifier; and
   (d) 18-24 percent of talc that is surface treated with a combination of 85 to 90 weight percent cetyl dimethicone and 10 to 15 percent 1-hexadecane, wherein the talc is characterized by:
      (i) a mean particle diameter of 1.8 μm;
      (ii) a Hegman fineness on grind value of 7;

(iii) a surface area of 14 m²/g; and a specific gravity of 2.8;
(iv) an average moisture of <0.5 weight percent; and
(v) a bulk density of 40 lbs/ft³.

5. The thermoplastic composition of claim 4, further comprising:
(e) 0-1 percent of a lubricant.

6. The thermoplastic composition of claim 4, further comprising:
(e) 0-1 percent of a lubricant; and
(f) 0-1 percent of an antioxidant.

7. The thermoplastic composition of claim 4, further comprising:
(e) 0-1 percent of a lubricant;
(f) 0-1 percent of an antioxidant; and
(g) 0-1 percent of a heat stabilizer.

8. The thermoplastic composition of claim 4, further comprising:
(e) 0-1 percent of a lubricant;
(f) 0-1 percent of an antioxidant;
(g) 0-1 percent of a heat stabilizer; and
(h) 0-1 percent of a colorant.

9. The thermoplastic composition of claim 8, wherein the polycarbonate comprises high-flow Bisphenol A polycarbonate having a melt flow rate (MFR) of 23.5-28.5 grams/10 minutes measured at 300° C. and 1.2 kilograms load; the polyester comprises one or more poly(alkylene terephthalates) selected from the group consisting of poly(ethylene terephthalate) (PET), poly(1,4-butylene terephthalate) (PBT), and poly(propylene terephthalate) (PPT); and the impact modifier is stabilized methyl methacrylate butadiene shell copolymer.

10. The thermoplastic composition of claim 9, wherein there is a 10 percent or less change in the molecular weight of the compounded polycarbonate as compared to molecular weight of the compounded polycarbonate in a composition containing talc that is not surface treated.

11. The thermoplastic composition of claim 9, wherein there is an 8 percent or more change in the molecular weight of the compounded polyester as compared to the molecular weight of the compounded polyester in a composition containing talc that is not surface treated.

12. The thermoplastic composition of claim 9, wherein the melt viscosity (MV) is 7 percent greater than the melt viscosity of a thermoplastic composition containing talc that is not surface treated.

13. The thermoplastic composition of claim 9, wherein the melt-volume flow rate (MVR) as measured according to ISO1133 is 10 percent greater than the melt-volume flow rates of a thermoplastic composition containing talc that is not surface treated.

14. A thermoplastic composition comprising, based on the total weight of the thermoplastic composition:
(a) 30-60 percent of one or more polycarbonates;
(b) 10-40 percent of one or more polyesters;
(c) 1-30 percent of one or more impact modifiers; and
(d) 18-24 percent of talc that is surface treated with a combination of 85 to 90 weight percent cetyl dimethicone and 10 to 15 percent 1-hexadecane, wherein the talc is characterized by:
(i) a mean particle diameter of 1.8 μm;
(ii) a Hegman fineness on grind value of 7;
(iii) a surface area of 14 m²/g; and a specific gravity of 2.8;
(iv) an average moisture of <0.5 weight percent; and
(v) a bulk density of 40 lbs/ft³ wherein:
there is a 10 percent or less change in the molecular weight of the compounded polycarbonate as compared to molecular weight of the compounded polycarbonate in a composition containing talc that is not surface treated;
the melt viscosity (MV) is 7 percent greater than the melt viscosity of a thermoplastic composition containing talc that is not surface treated;
the melt-volume flow rate (MVR) as measured according to ISO1133 is 10 percent greater than the melt-volume flow rates of a thermoplastic composition containing talc that is not surface treated.

15. An article comprising the composition of claim 1.

\* \* \* \* \*